C. A. W. JAQUETT.
Feed-Rolls for Middlings, Flour, &c.

No. 216,617.    Patented June 17, 1879.

Attest:
H. L. Perrine,
Floyd Norris

Inventor.
Charles A. W. Jaquett
By Johnson & Johnson
Atty's

UNITED STATES PATENT OFFICE.

CHARLES A. W. JAQUETT, OF BROOKLYN, NEW YORK.

IMPROVEMENT IN FEED-ROLLS FOR MIDDLINGS, FLOUR, &c.

Specification forming part of Letters Patent No. 216,617, dated June 17, 1879; application filed April 26, 1879.

*To all whom it may concern:*

Be it known that I, CHARLES A. W. JAQUETT, of Brooklyn, in the county of Kings and State of New York, have invented certain new and useful Improvements in Feed-Rolls for Middlings, Flour, Grain, and the like, of which the following is a specification.

My invention is an improvement in the roll-feed for middlings, flour, grain, and the like, for the purpose of rendering such feed uniform in larger or smaller quantities.

Hitherto such feed-rolls have been adapted to run in the same direction with the material, so that chips or hard particles too large to pass between the rolls will stop the feed at such point to the extent of its size. Moreover, in such case, in feeding flour, more or less of it is carried around with the rolls, and the uniformity of the feed thereby rendered more or less imperfect.

My improvement obviates these difficulties; and the said improvement consists of one or more rolls adapted to give a down-feed with an upward-approaching revolving motion against the gravitation of the material, thus giving the feed from the hopper the reverse of the running of the rolls and effecting a complete shedding of the material from the rolls. In effecting this I have used one roll to good advantage with an adjustable side or gage at one side of the hopper; but two rolls thus operating will give the best results; and in case of chips or any hard substance in the material passing to the feed-space between the rolls, such substance will be raised with a constant motion, and will not affect the uniformity of the feed.

I may also use an armed agitator in the hopper, revolving above and centrally between the rolls, for agitating the material above the feed.

Figure 1:
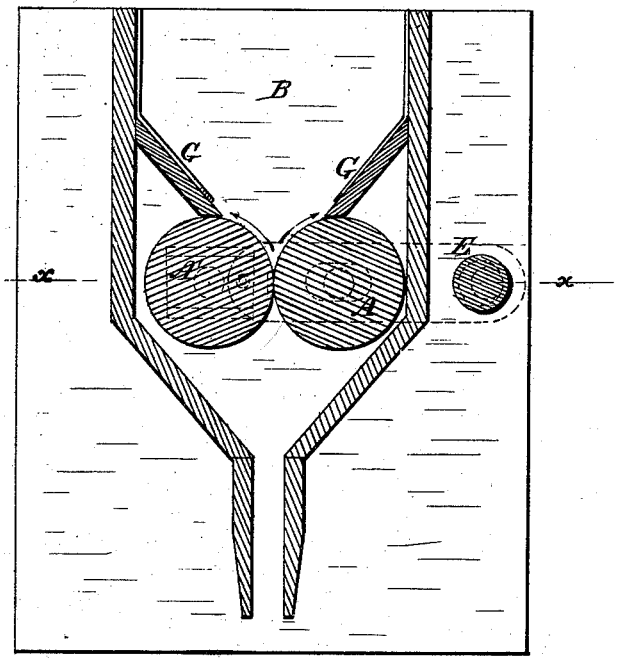
Figure 3:
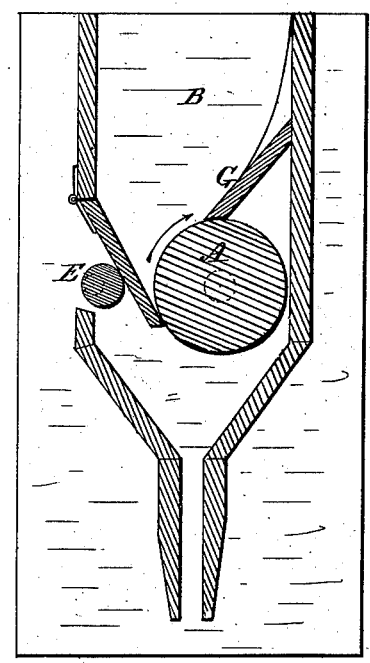
Figure 2:
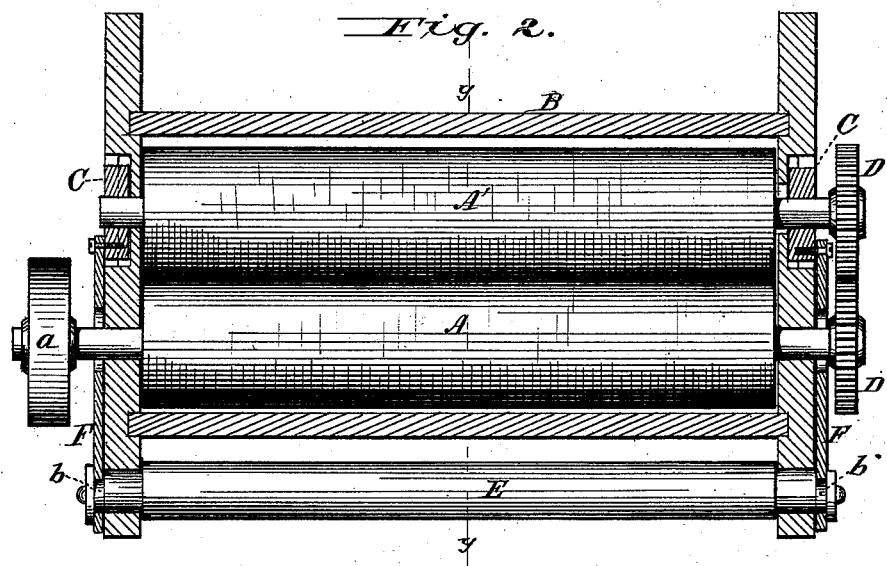

Referring to the drawings, Figure 1 represents a vertical cross-section of feed-rolls adapted for operation as stated; Fig. 3, a similar section of a single feed-roll, and Fig. 2 a horizontal section of Fig. 1.

The feed-rolls A A' are mounted in bearings in any suitable hopper-frame, B, and the rolls are of suitable diameter, and of a length equal to that of the hopper proper, the lower part of which terminates below the rolls in a long narrow slit. One of these feed-rolls, A', is mounted in slide-bearings C in the frame, in a manner to allow said roll to be adjusted toward or from the other roll to regulate the feed-space between them; and they are adapted, by suitable gearing D D at the corresponding ends of the rolls, to be revolved upward to effect a down-feed—that is, giving a direction to the rolls opposite to the direction of the material passing through or between them—whereby to effect, under all circumstances, a perfect shedding of the material and a uniform feed, which is so important to the proper action of crushing-rolls for middlings, or in mixing and feeding flour, grain, and the like.

Under this new method of feeding, any hard foreign substance passing to the feed-space will be kept upward and in motion by the rolls, so that such substance could not obstruct the passage or interrupt the uniformity of the feed, as is the case with the usual rolls having both a downward feed and a downward revolution. Such upward revolution and downward feed also prevent the flour from being carried around with the rolls, hence not only giving an absolutely uniform feed, but preventing all waste from such cause.

The non-adjustable roll is driven by a pulley, *a*, or in any suitable way, while the adjustment of the adjustable roll is effected in any suitable manner. For this purpose, however, I have shown a hand-roll, E, at the outer side of the hopper-frame, and having eccentric bearings *b b*, to which slides F F are connected, and which are connected to the bearings of the said adjustable feed-roll, so that by turning said eccentric hand-roll the adjustment is made quickly and uniformly, to give greater or less feed, as may be required, for the material being treated.

The inner sides of the hopper are provided with sides G G, which, inclining inward, extend to the top surface of the rolls and are in contact therewith, to prevent the upward turning of the rolls from carrying out the flour or meal.

Instead of the two rolls operating as described, I may use one upward-turning roll with an adjustable side or gage secured to the inner side of the hopper; but I prefer to use two upward-turning rolls, as giving the best results. I may also use an armed agitator, arranged in the hopper above and centrally between the upward-turning rolls, for the purpose of agitating the material and keeping it in proper condition for being fed.

I have used the upward-turning rolls with downward feed in middlings crushers and purifiers with the highest satisfaction.

I have described the rolls as having equal speed; but it is obvious that one of them may have a speed greater than the others, if desired.

I claim—

1. In a hopper-feed, the combination, with the wall or valve constituting one side of the delivery-opening, of a feed-roll constituting the opposite side of said opening, and revolving in an opposite direction to that of the feed.

2. The feed-rolls of hoppers in middlings, flour, and grain apparatus, each of said rolls having an upward-approaching revolution against the gravitation of the material, to effect a downward uniform shedding of the material from said rolls.

In testimony whereof I have hereunto set my hand in the presence of two witnesses.

CHARLES A. W. JAQUETT.

Witnesses:
C. HERWIG,
J. Y. MILLER.